United States Patent [19]
Martinez et al.

[11] 3,945,162
[45] Mar. 23, 1976

[54] TIRE CHAIN DEVICE

[76] Inventors: Delbert L. Martinez, 8301 Clemson Lane, Westminster, Colo. 80030; Michael J. Martinez, 1240 Leyden St., Denver, Colo. 80220; Morris P. Martinez, 11610 Garfield St., Thornton, Colo. 80233

[22] Filed: Dec. 26, 1974

[21] Appl. No.: 536,587

[52] U.S. Cl............................. 152/213 R; 152/233
[51] Int. Cl.².......................................... B60C 27/02
[58] Field of Search ........... 152/170, 171, 172, 185, 152/186, 213 R, 213 A, 217–220, 225–241

[56] References Cited
UNITED STATES PATENTS

| | | | |
|---|---|---|---|
| 1,339,963 | 5/1920 | Mahan | 152/241 |
| 2,505,724 | 4/1950 | Robbins | 152/213 R X |
| 3,362,450 | 1/1968 | Brown | 152/233 |
| 3,481,384 | 12/1969 | Triglia | 152/233 |

*Primary Examiner*—Drayton E. Hoffman
*Assistant Examiner*—Larry H. Martin
*Attorney, Agent, or Firm*—Burton, Crandell & Polumbus

[57] ABSTRACT

A tire chain device includes a backing plate mountable between the wheel and brake drum of a vehicle and having a continuous circular anchor rod as part thereof. A plurality of cross chains are connected at one end to a main chain member extending around the outer face of the vehicle tire with the opposite or inner ends of the cross chains having a hook thereon adapted to be releasably anchored to the circular rod on the backing plate. The main chain includes a tensioning hook adapted to tighten the main chain to draw the cross chains tightly across the periphery of the tire.

1 Claim, 5 Drawing Figures

U.S. Patent   March 23, 1976   Sheet 1 of 2   3,945,162
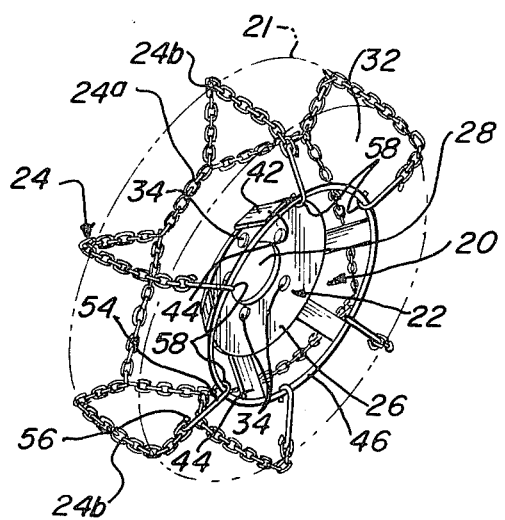
Fig_1
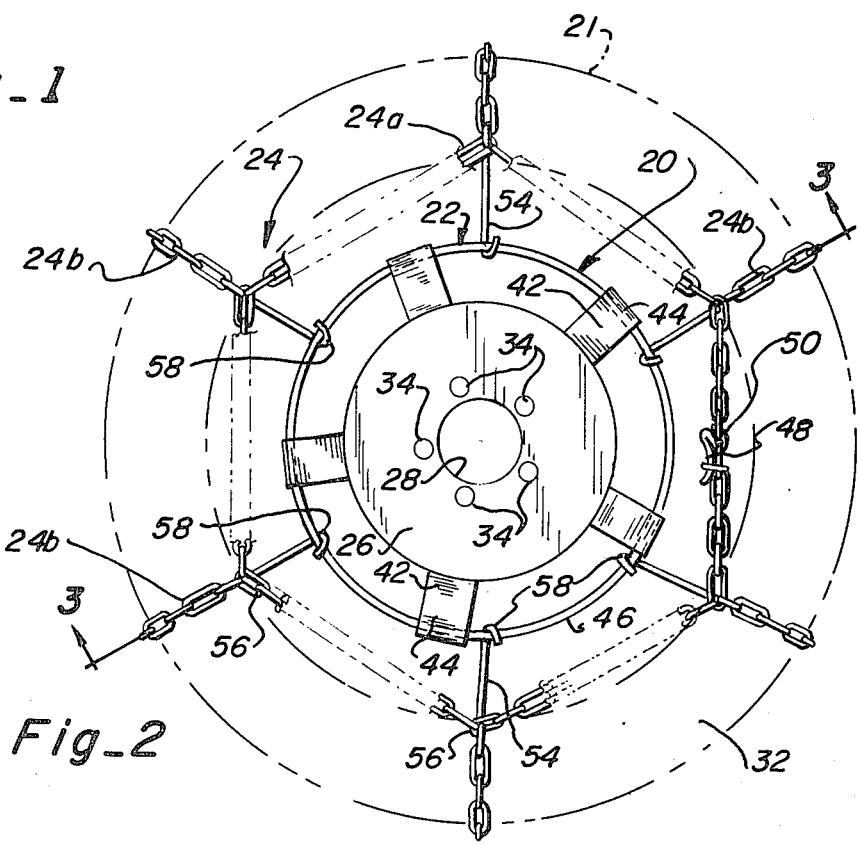
Fig_2
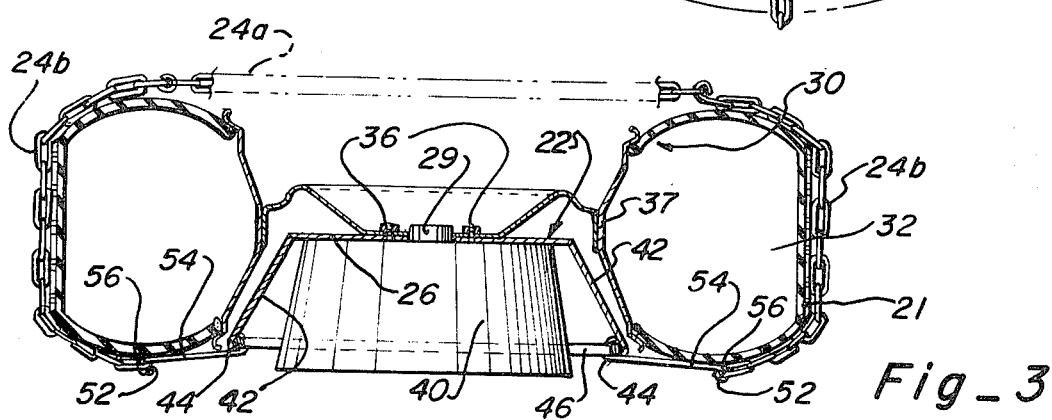
Fig_3

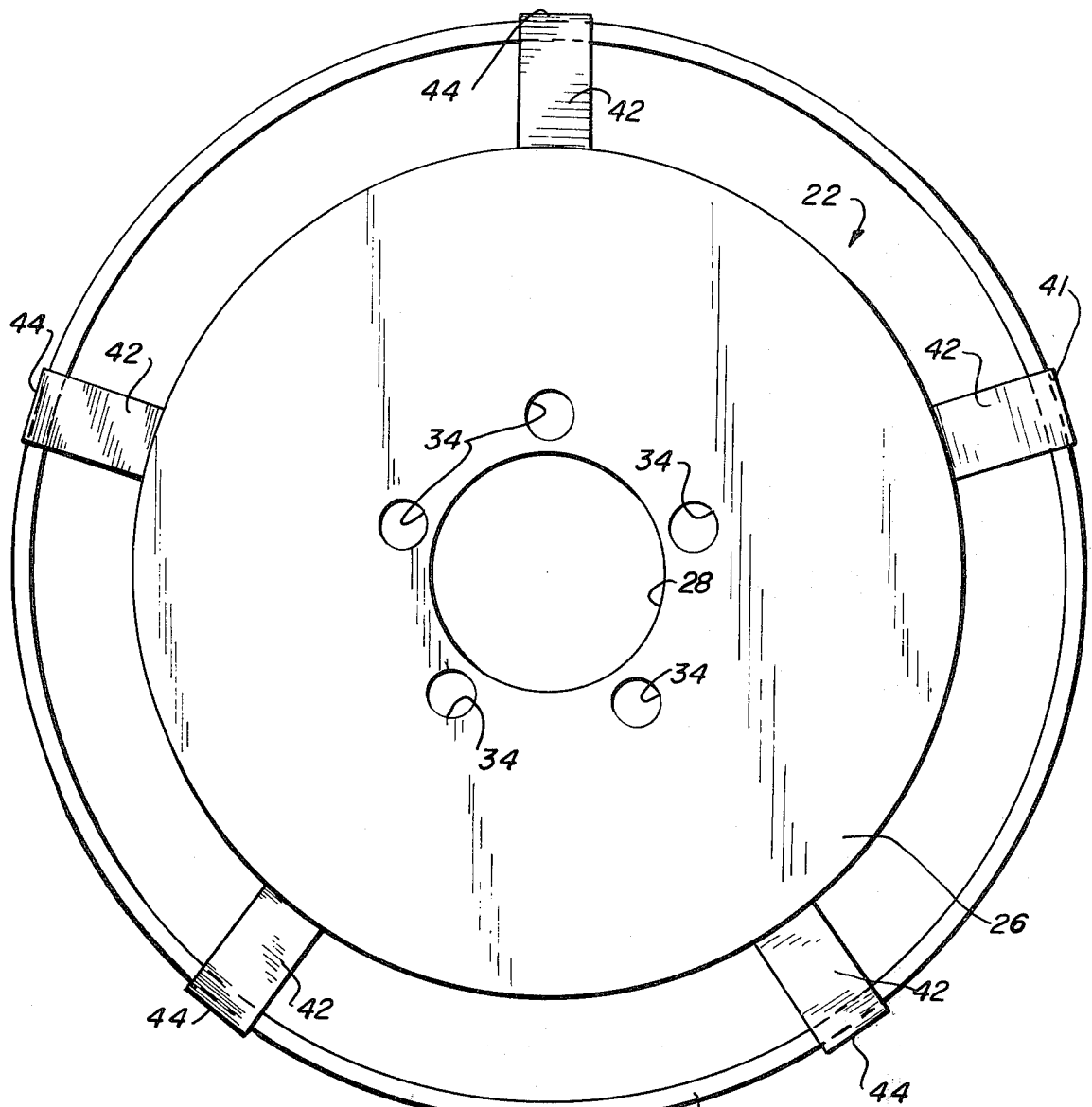
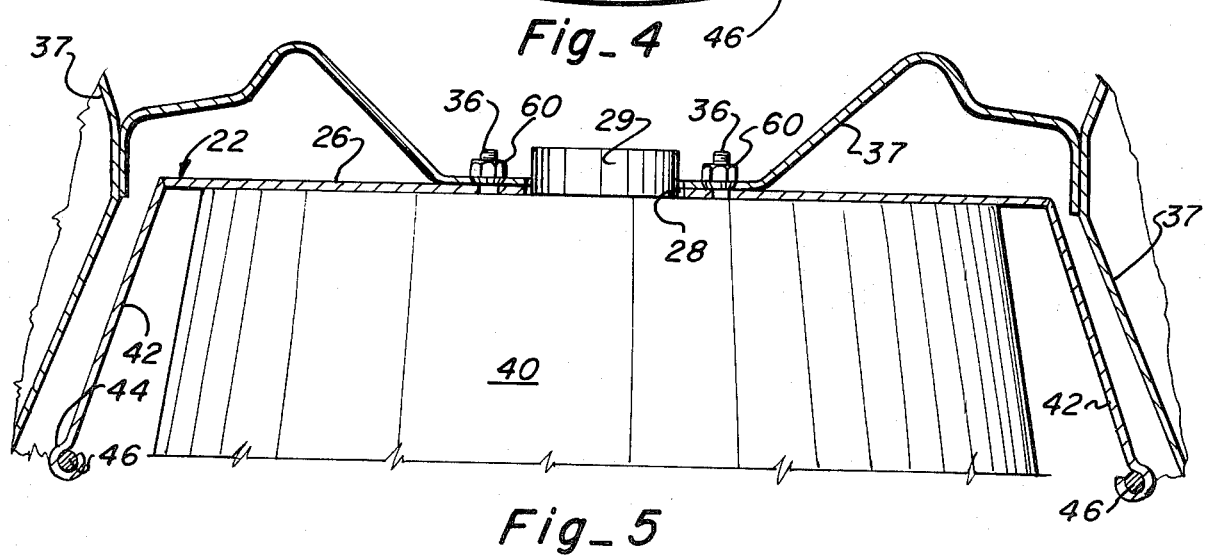
Fig_4
Fig_5

TIRE CHAIN DEVICE

BACKGROUND OF THE INVENTION

The present invention relates generally to traction devices for vehicles and more particularly to a tire chain device adapted for quick and easy mounting and dismounting.

Numerous devices have been conceived, manufactured and commercialized to improve the traction of motor vehicles over soft or slippery surfaces such as snow, mud, ice and the like. The device which has probably given the best traction on these types of surfaces is the tire chain which includes a plurality of cross chains passing across the periphery of a tire so as to engage the surface when the tire is advanced thereacross.

Conventional tire chains, however, have typically been very difficult to mount and dismount from vehicle tires causing great anguish to those attempting to mount and dismount the tire chains. Further, the typical tire chain does not maintain a fixed position upon the tire thereby sometimes placing the chains under undue strain causing them to break and thereafter lash the vehicle resulting in damage to the vehicle.

Accordingly, it is a primary object of the present invention to provide a new and improved tire chain device which is simple in construction, reliable in operation and easy to mount and dismount from a tire in a short period of time.

It is another object of the present invention to provide a new and improved tire chain device wherein a plurality of cross chain members are releasably anchored on their ends to a rigid anchor on the inner side of the wheel to facilitate quick and easy mounting and dismounting of the device.

It is another object of the present invention to provide a new and improved tire chain device including a backing plate which can be permanently mounted upon the vehicle between the wheel and the brake drum where it is not visible and a chain assembly having cross chains which pass across the periphery of the tire and are releasably connected to the backing plate to secure the chain assembly on the tire.

It is another object of the present invention to provide a new and improved tire chain device wherein a backing plate is mounted between the vehicle wheel and the brake drum and includes a connection rod to which cross chains of a chain assembly can be quickly and easily releasably connected in mounting the tire chain upon the vehicle tire.

Other objects, advantages and capabilities of the present invention will become more apparent as the description proceeds when taken in conjunction with the accompanying drawings.

SUMMARY OF THE INVENTION

The tire chain device of the present invention is simple and economical to manufacture and yet can be mounted upon a vehicle tire in a short period of time and reliably maintain its position upon the vehicle tire for optimum results in giving the vehicle traction over soft or slippery surfaces such as snow, mud, ice and the like.

More particularly, the tire chain device of the present invention includes an attachment rod or the like disposed adjacent the unexposed face of the vehicle wheel and a chain assembly including a plurality of cross chains which extend across the periphery of the tire and are releasably connectable to the attachment rod. The opposite ends of the cross chains are each connected to a common main chain which can be tightened to secure the attachment of the cross chains to the attachment rod.

In the preferred form of the invention, the attachment rod is part of a backing plate which is mountable between the vehicle wheel and the brake drum in a manner such that it can remain mounted upon the vehicle through all seasons and, therefore, does not have to be taken on and off the vehicle each time the chains are mounted or dismounted. The attachment rod preferably is in the form of a circular loop so as to be conveniently disposed for attachment of the cross chains which are equally spaced around the circumference of the tire.

BRIEF DESCRIPTION OF THE DRAWINGS

FIG. 1 is a perspective view of the tire chain device of the present invention showing a tire upon which the device is mounted in phantom lines.

FIG. 2 is an enlarged side elevation taken from the front side of a vehicle tire with the tire shown in phantom lines.

FIG. 3 is a section taken along line 3—3 of FIG. 2.

FIG. 4 is an enlarged plan view of the backing plate portion of the tire chain device shown in FIG. 1.

FIG. 5 is a section taken through a vehicle brake drum and wheel showing the backing plate of the tire chain device mounted therebetween.

DESCRIPTION OF THE PREFERRED EMBODIMENT

Referring first to FIG. 1, the tire chain device 20 of the present invention can be seen mounted upon a vehicle tire 21 shown in phantom lines. The tire chain device includes a backing plate member 22 and a chain assembly 24 with the chain assembly having a main or common chain 24a and equally spaced cross link chains 24b connected thereto along its length.

The backing plate 22, as is seen in each of the figures, has a generally circular plate portion 26 with a centrally located circular opening 28 adapted to receive the axle 29 of a vehicle carrying the wheel and tire assembly 30 upon which the tire chain device 20 is to be mounted. Five equally spaced apertures 34 are provided through the circular plate 26 in a concentric circular array around the central opening 28 and are of a size and spacing to receive the five stud bolts 36 conventionally provided on motor vehicles for mounting the wheel 37 of the vehicle. As is best seen in FIGS. 3 and 5, the plate portion 26 of the backing plate 22 is mounted upon the stud bolts 36 between the brake drum 40 of the vehicle and the wheel 37. Five rigid straps or support arms 42 are secured, as by welding at equally spaced intervals to the outer peripheral edge of the plate 26 so as to diverge rearwardly from the plate at an obtuse angle of approximately 110° with the plate. Each of these support arms are of generally rectangular configuration and pass through a reverse bend 44 at their distal end so as to receive and retain a circular anchor rod 46. The anchor rod can, therefore, be seen to be concentric with the axle 29 circumscribing the brake drum 40 and is positioned immediately adjacent to the rearward most extent of the wheel 37 of the vehicle. The backing plate 22 is made of a strong rigid material such as steel, so as to positively retain the position indicated in the drawings relative to the wheel and tire assembly 30 for reasons to become more clear later.

The main or common chain 24a is preferably of the link type. It is of a fixed length and has a conventional tensioning latch arm 48, FIG. 2, at one end adapted to cooperate with a loop 50 on the opposite end to unite the chain in a closed loop on the front face of the tire and to selectively reduce the size of the loop for a purpose to be explained later. The tensioning arm 48 is operated by first connecting it to the loop 50 at the opposite end of the main chain 24a and then, pivoting it about its connection to the chain causing the chain to retract circumferentially reducing the size of the loop formed by the main chain. The cross chains 24b are also of the link type and are positively affixed to the main chain 24a in a conventional manner at equally spaced intervals along the length of the main chain. The free ends of the cross chains have a hook shaped connector 52, FIG. 3, secured thereto for retaining one end of a hook arm 54 which serves to releasably connect the associated cross chains to the circular rod 46 on the backing plate 22. The hook arm 54 has an eyelet 56 formed on one end for connection to the connector 52 and its opposite end is provided with a U-shaped hook, adapted to fit around and thereby releasably latch onto the anchor rod 46. In this manner, the cross chains can be quickly and easily connected to the anchor rod even without visually observing the connecting operation.

When mounting the tire chain device 20 on a vehicle, the backing plate 22 is first mounted upon the stud bolts 36 between the wheel 37 and the brake drum 40 and secured in position by the conventionally provided lugs 60, FIG. 5, used to hold the wheel on the vehicle. The backing plate is mounted so that the support arms protrude inwardly or toward the opposite wheel, whereby the anchor rod 46 is positioned adjacent to the rear or innermost edge of the wheel. The chain assembly 24 is then mounted on the tire by first securing a pair of cross chains 24b to the anchor bar at or near the top of the tire so that the remainder of the chain assembly hangs downwardly from the top of the tire across the front or exposed face of the tire. Next the remaining cross chains are connected to the anchor bar until each has been connected and extends across the periphery of the tire. Finally the free ends of the common or main chain 24a are connected with the tensioning arm 48 and cooperating loop 50 and tensioned thereby by reducing the size of the loop formed by the chain. Tensioning of the main chain draws the cross chains radially inwardly on the exposed face of the tire so that the hook arms 54 on the rear face of the tire are drawn tightly against the anchor rod to positively secure them to the anchor rod. It will, therefore, be appreciated that the chain assembly is positively positioned on the tire and will not shift due to the rigid backing plate to which it is attached and the non-extensible common or main chain which anchors the opposite ends of the non-extensible cross link chains.

While the illustrated form of the invention is shown with six cross link chains, it will be appreciated that any number of cross link chains can be utilized to satisfy various legal requirements regarding the number of cross link chains.

Although the present invention has been described with a certain degree of particularity, it is understood that the present disclosure has been made by way of example and that changes in details of structure may be made without departing from the spirit thereof.

What is claimed is:

1. A tire chain device adapted to be mounted upon a tire which is in turn mounted on a wheel secured on a vehicle axle by a plurality of stud bolts and connecting lugs, comprising in combination:

a circular backing plate member mountable between said wheel and the vehicle having a plate portion with a central opening for receiving the axle of the vehicle and a plurality of stud holes for receiving the stud bolts, support arms affixed at one end to the plate portion at equally spaced intervals around its periphery, a rigid circular anchor rod supported by the opposite ends of said arms so that the anchor rod is disposed in concentric relationship with the axle of the vehicle and forms a continuous catch around said axle, and a chain assembly including a main chain adapted to be formed in a loop adjacent to the exposed face of the tire, connector means on the ends of the main chain to releasably secure the main chain in a closed loop, said connector means having means for selectively reducing the size of the loop formed by the main chain, a plurality of cross chain members having one end secured to the main chain at equally spaced intervals along the length of the main chain and the opposite ends having hook-shaped connector means adapted to be releasably connected to said circular rod at variable locations along the circular extent of the rod when the cross chain members are extended across the periphery of the tire.

* * * * *